United States Patent
Marsillach et al.

(10) Patent No.: US 12,503,140 B2
(45) Date of Patent: Dec. 23, 2025

(54) HYBRID DATA-DRIVEN ACTOR PREDICTION USING REACHABLE SETS AND SUPERVISED LEARNING

(71) Applicant: GM Global Technology Operations LLC, Detroit, MI (US)

(72) Inventors: Daniel Aguilar Marsillach, Chicago, IL (US); Rouhollah Sayed Jafari, Troy, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 236 days.

(21) Appl. No.: 18/494,234

(22) Filed: Oct. 25, 2023

(65) Prior Publication Data

US 2025/0136152 A1    May 1, 2025

(51) Int. Cl.
   *B60W 60/00*    (2020.01)
(52) U.S. Cl.
   CPC ... *B60W 60/0027* (2020.02); *B60W 2520/105* (2013.01); *B60W 2520/125* (2013.01); *B60W 2552/53* (2020.02); *B60W 2556/35* (2020.02); *B60W 2556/40* (2020.02)
(58) Field of Classification Search
   CPC ......... B60W 60/0027; B60W 2552/53; B60W 2556/40; B60W 2556/35; B60W 2520/105; B60W 2520/125
   USPC .......................................................... 701/25
   See application file for complete search history.

(56) References Cited

U.S. PATENT DOCUMENTS

| | | | |
|---|---|---|---|
| 11,808,582 B1* | 11/2023 | Dolan | G01C 21/34 |
| 12,299,359 B1* | 5/2025 | Semple | G06F 30/20 |
| 2021/0255622 A1 | 8/2021 | Haynes et al. | |
| 2021/0276591 A1* | 9/2021 | Urtasun | G01S 13/865 |
| 2022/0119011 A1* | 4/2022 | Li | B60W 60/00276 |
| 2023/0154198 A1* | 5/2023 | Makansi | G06V 20/58 |
| | | | 382/103 |

FOREIGN PATENT DOCUMENTS

CN    116050245 A    *    5/2023    .............    G06F 30/27

OTHER PUBLICATIONS

Guoqiang Li, Real-Time Optimal Trajectory Planning for Autonomous Driving with Collision Avoidance Using Convex Optimization, Jun. 19, 2023, Automotive Innovation (2023) (Year: 2023).*

* cited by examiner

*Primary Examiner* — Matthias S Weisfeld
(74) *Attorney, Agent, or Firm* — Vivacqua Crane, PLLC

(57) ABSTRACT

A method for predicting an actor occupancy corridor includes receiving input data, predicting an occupancy sets of the actor using reachability analysis and the input data, determining an occupancy corridor constraints of the actor using a machine learning model and the input data, and determining an occupancy corridor of the actor using the occupancy corridor constraints of the actor using the machine learning model and the occupancy sets of the actor using a reachability analysis. Moreover, the method includes controlling the movement of a host vehicle based on the occupancy corridor of the actor.

20 Claims, 4 Drawing Sheets

HYBRID DATA-DRIVEN ACTOR PREDICTION USING REACHABLE SETS AND SUPERVISED LEARNING

INTRODUCTION

The present disclosure relates to methods and systems for actor prediction and, more specifically, to a hybrid data-driven actor prediction systems and methods using reachable sets and supervised learning.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Autonomous vehicles use models for predicting the position of other actors on the road. State-of-the-art (SOTA) actor prediction models are data-driven prediction models. These data-driven prediction models are not necessarily robust and output a finite number of hypotheses that do not cover the space of possible future positions of the actor well. Other approaches include reachability theory-based actor predictions, which tend to be overly-conservative. Specifically, reachability-based actor prediction models are mostly useful in the short-term and do not scale well in complex, chaotic, and congested driving environments because of their conservative nature. It is therefore desirable to develop a method and system for predicting actor positions, or occupancies on a map, that are conservative in the short-term.

SUMMARY

The present disclosure describes a method for predicting an actor occupancy corridor. The method includes receiving input data. The input data includes map data and initial trajectory data. The map data includes a map of an area surrounding an actor. The initial trajectory data includes the initial trajectory of the actor. The method further includes predicting a plurality of occupancy sets of the actor leveraging exact or approximate reachability analyses such as Hamilton-Jacobi reachability, sampling-based optimal control methods, polytopic or polyhedral set-based methods, zonotope reachability, ellipsoidal reachability, among others, and the input data. Further, the method includes determining an occupancy corridor of the actor using a machine learning model and the input data, determining an occupancy corridor of the actor using the occupancy corridor constraints of the actor using the machine learning model and the occupancy sets of the actor using reachability theory. Moreover, the method includes controlling the movement of a host vehicle based on the occupancy corridor of the actor. The host vehicle is an autonomous vehicle. The method described in this paragraph improves autonomous vehicle technology by accurately and reasonably predicting the position of an actor on the road, thereby allowing the host vehicle to maneuver adequately to avoid contacting the actor.

In some aspect of the present disclosure, the method may include receiving perception data from a plurality of sensors of the host vehicle. The perception data includes information about the area surrounding the actor. Further, the method includes fusing the perception data with the map data to generate scene data. The scene data includes a nominal route path and a road centerline of a road. The actor is moving on the road. The initial trajectory data includes a longitudinal acceleration and a lateral acceleration of the actor, the reachability analysis uses the longitudinal acceleration and the lateral acceleration of the actor as well as an assume model, including kinematic, dynamic, or machine learning model, and the occupancy sets of the actor are a collection of forward reachable sets of positions over a predetermined amount of time. The method further includes determining that the forward reachable set of the actor does not intersect other traffic participants for a predetermined period of time and determining that the forward reachable set of the actor is within permissible road positions. The occupancy corridor is determined using the output accelerations of the actor. The occupancy corridor constraints of the actor include the maximum acceleration of the actor and the minimum acceleration of the actor. The method may include determining that a trajectory of the host vehicle intersects the occupancy corridor of the actor. The method may include removing the trajectory of the host vehicle that intersects the occupancy corridor of the actor. The method may include determining that a trajectory of the host vehicle does not intersect the occupancy corridor of the actor. The method may include commanding the host vehicle to move along the trajectory of the host vehicle that does not intersect the occupancy corridor of the actor. Implementations of the described techniques may include hardware, a method or process, or computer software on a computer-accessible medium.

The present disclosure also describes a system for predicting an actor occupancy corridor. The system includes sensors and a controller in communication with the sensors. The controller includes a processor and a non-transitory computer-readable medium and is programmed to execute the method described above.

The present disclosure further describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
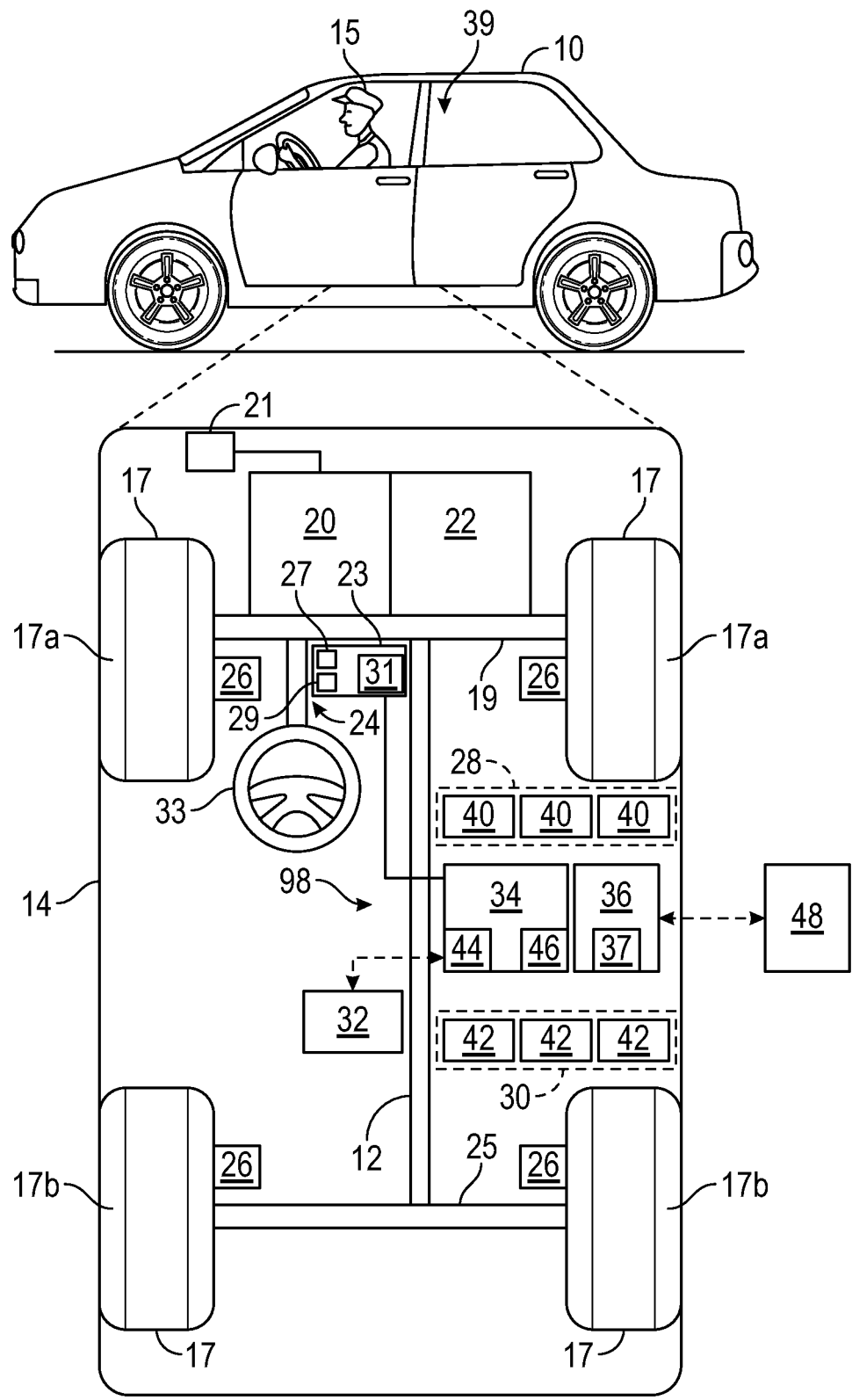
FIG. 1 is a block diagram depicting a host vehicle including a hybrid data-driven actor prediction system using reachable sets and supervised learning.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a chassis 12, a vehicle body 14, front and rear wheels 17 and may be referred to as a vehicle system. In the depicted embodiment, the host vehicle 10 includes two front wheels 17a and two rear wheels 17b. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17a and a rear axle 25 coupled to the rear wheels 17b.

In various embodiments, the host vehicle 10 may be an autonomous vehicle, and a system 98 is incorporated into the host vehicle 10. The system 98 may be referred to as the hybrid data-driven actor prediction system using reachable sets and supervised learning. The host vehicle 10 is, for example, a vehicle that is automatically controlled to carry passengers (e.g., vehicle occupant 15) from one location to another. The host vehicle 10 may be configured as a truck, sedan, coupe, sport utility vehicle (SUV), recreational vehicles (RVs), etc. In an embodiment, the host vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control.

As shown, the host vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences the position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the controller 34 and may include, but are not limited to, one or more radars, one or more light detection and ranging (LIDAR) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more cameras, one or more gyroscopes, one or more accelerometers, one or more inclinometers, one or more speed sensors, one or more three-dimensional (3D) depth sensor, one or more ultrasonic sensors, one or more inertial measurement units (IMUs), thermal imaging sensors, one or more microphones 31 and/or other sensors. Each sensor 40 is configured to generate a signal that is indicative of the sensed observable conditions (i.e., sensor data) of the exterior environment and/or the interior environment of the host vehicle 10. Because the sensor system 28 provides sensor data to the controller 34, the sensor system 28 and its sensors 40 are considered sources of information (or simply sources).

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the controller 34, reroute from the controller 34, or part of the controller 34 and part of a reroute system.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the host vehicle 10. The controller 34 of the host vehicle 10 may be referred to as a vehicle controller and may be programmed to execute a method 100 (FIG. 3) and/or a method 200 (FIG. 4) as described in detail below.

The instructions may include one or more reroute programs, each of which comprises an ordered listing of executable instructions for implementing logical functions. The instructions, when executed by the processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single controller 34 is shown in FIG. 1, embodiments of the host vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the host vehicle 10. In various embodiments, one or more instructions of the controller 34 are embodied in the system 98.

The host vehicle 10 includes a user interface 23, which may be a touchscreen 43 (FIG. 3) in the dashboard. The user interface 23 may include, but is not limited to, an alarm, such as one or more speakers 27 to provide an audible sound, haptic feedback in a vehicle seat or other object, one or more displays 29, one or more microphones 31 (e.g., a microphone array) and/or other devices suitable to provide a notification to the vehicle user of the host vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a person (e.g., vehicle occupant 15). Accordingly, the controller 34 is configured to receive inputs from the user via the user interface 23. While the microphone 31 is shown in FIG. 1 as part of the user interface 23, other microphones 31 may be part of the sensor system 28. The microphones 31 is configured to capture voice commands from vehicle occupants 15 in the passenger compartment 39 of the host vehicle 10. It is envisioned, however, that the microphones 31 may be coupled to other parts of the host vehicle 10. Regardless of its exact location, the microphones 31 is in communication with the controller 34.

The host vehicle 10 may include one or more displays 29 configured to display one or more images as described below. For instance, the display 29 may be configured to present information to one or more vehicle occupant 15 inside the passenger compartment 39 of the host vehicle 10. The display 29 is in communication with the controller 34. Accordingly, the controller 34 is configured to control the operation of the display 29.

The communication system 36 is in communication with the controller 34 and is configured to wirelessly communicate information to and from other entities, such as the remote entities 48 using, for example, Vehicle-to-everything (V2X) technology. As non-limiting examples, the communication system 36 may transmit and/or receive information from other vehicles ("V2V" communication), infrastructure ("V2I" communication), remote systems at a remote call center (e.g., ON-STAR by GENERAL MOTORS) and/or personal electronic devices, such as a mobile phone. Some of the remote entities 48 may also be configured to wirelessly communicate information to and from other entities, such as the remote vehicles 48 using, for example, V2X technology. In the present disclosure, the remote vehicles 48 that are capable of wirelessly communicating information to and from other entities, such as the remote vehicles 48, are referred to as V2X-capable remote vehicles. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication system 36 is configured to wirelessly communicate information between the host vehicle 10 and another vehicle (i.e., a remote entity 48). Further, the communication system 36 is configured to wirelessly communicate information between the host vehicle 10 and infrastructure.

Figure 2:
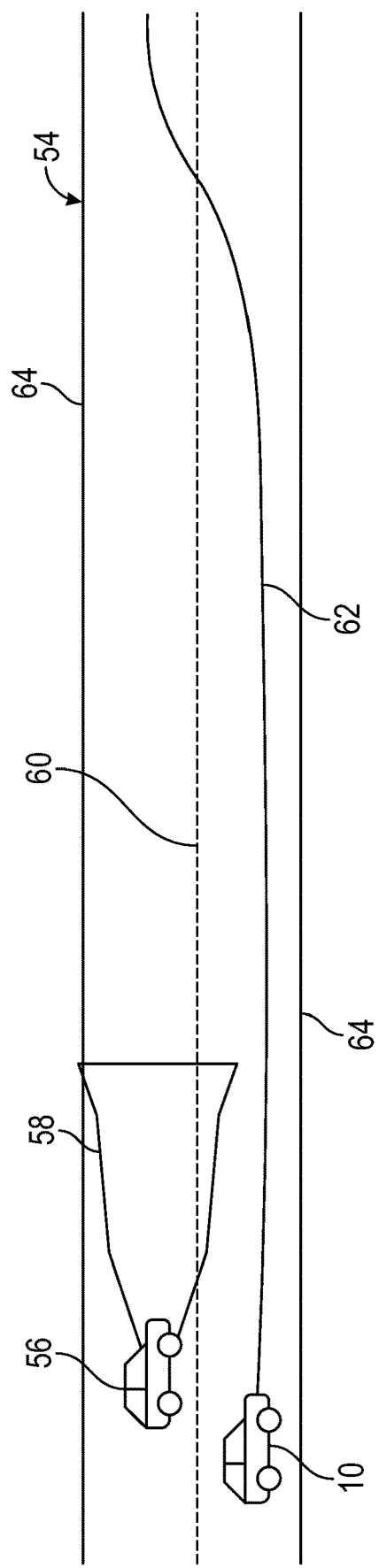
FIG. 2 is a schematic diagram of the host vehicle and an actor moving along a road.

With reference to FIG. 2, in several driving scenarios, the host vehicle 10 may drive on a road 54 while other actors 56 (e.g., another vehicle, pedestrian, cyclist, etc.) move along the same road 54. In such driving scenarios, it is desirable to predict an occupancy corridor 58 of the actor 56 in the short-term (e.g., zero to five seconds) to allow the host vehicle 10 to avoid coming into contact with the actor 56. Specifically, the host vehicle 10 may consider the centerline 60 of the road 54 and the predicted occupancy corridor 58 of the actor 56 to select a path 62. The presently disclosed hybrid data-driven actor prediction system 98 incorporates reachable set analyses as well as observed real-world or simulation data. In doing so, the system 98 predicts sets that tightly bound the observed trajectories of actors 56 that head similar features in variable driving scenarios and conditions. In other words, actors 56 with similar features will have similar predicted occupancy corridors 58. In the system 98, the prediction of the occupancy corridor 58 is a function of various complex features, namely: actor aggressiveness, scene uncertainty, road geometry, weather conditions, vehicle class, among others. The system 98 computes open-loop occupancy corridor predictions faster than other systems by levering a machine learning model, thereby saving computing power and energy. The system 98 is also less conservative than other approaches because the occupancy corridor predictions are a function of actor aggressiveness, scene uncertainty, vehicle class/type, map geometry, and other complex features and are used for a short-term horizon. The system 98 is more conservative than purely data-driven approaches because the system 98 outputs sets, envelopes, and/or regions instead of singleton trajectories.

Figure 3:
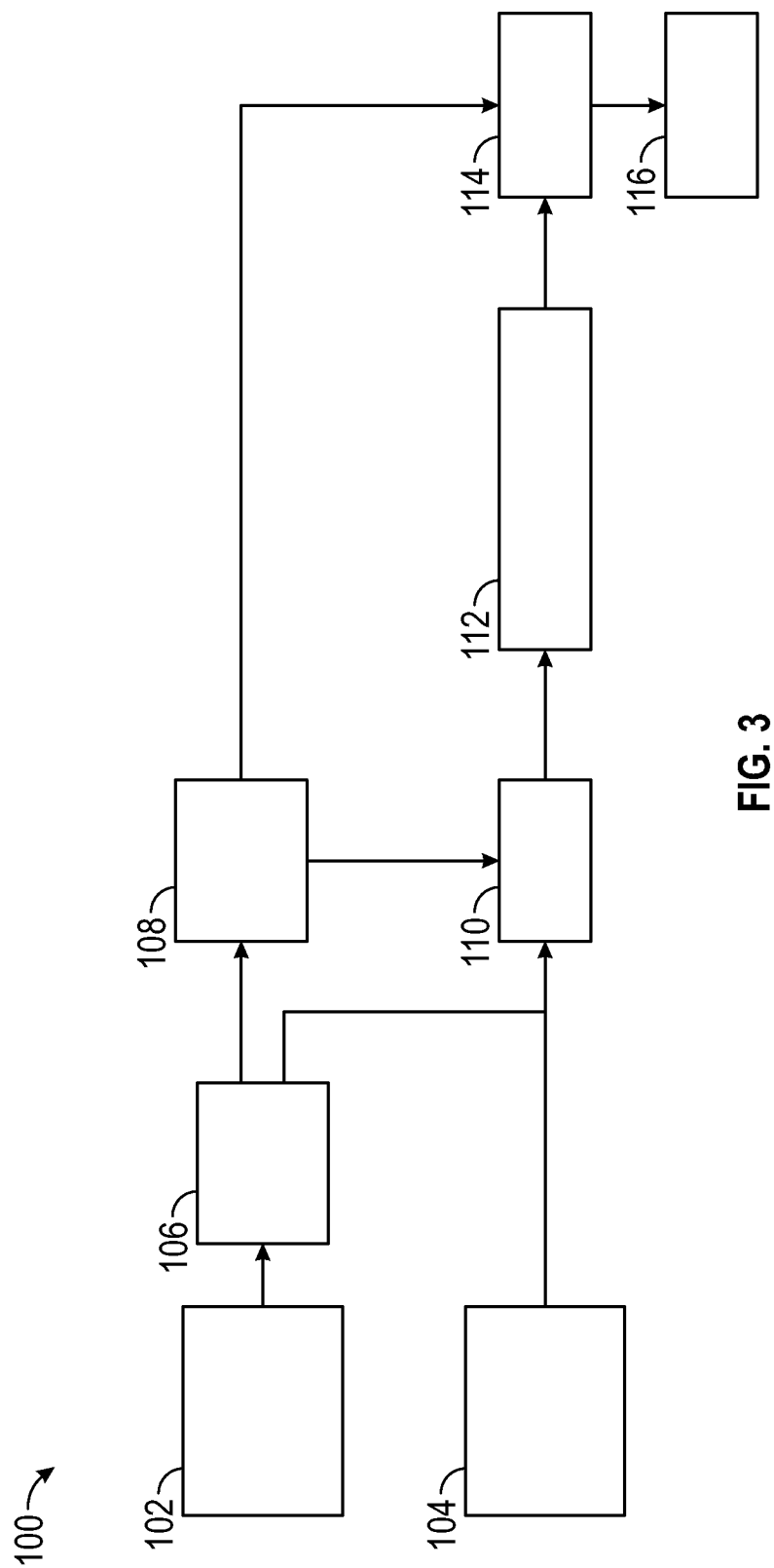
FIG. 3 is a flowchart of a hybrid data-driven actor prediction method using reachable sets and supervised learning.

FIG. 3 is a flowchart of a hybrid data-driven actor prediction method 100 that uses reachable sets and supervised learning. The method 100 beings at block 102 and block 104. At block 102, the controller 34 receives map data.

As non-limiting examples, the map data includes a map of an area surrounding the actor 56, the road centerlines 60, and the nominal path route of the actor 56. At block 104, the controller 34 receives initial trajectory data of the actor 56. The initial trajectory data includes an initial trajectory of the actor 56. The map data and the initial trajectory data may collectively be referred to as the input data. Accordingly, the controller 34 initially receives the input data. Then, the method 100 proceeds to block 106.

At block 106, scene fusion occurs. Specifically, at block 106, the controller 34 receives perception data from the sensors 40 (e.g., cameras, lidar, etc.) of the host vehicle 10 and/or the actor 56. The perception data includes information about the area surrounding the actor 56. The perception data is then fused with the map data to generate scene data. The scene data includes a nominal route path of the actor 56, a road centerline 60 of the road 54, road geometry of the road 54, etc. As discussed above, the host vehicle 10 and/or the actor 56 may be moving on the road 54. Next, the method 100 continues to block 108. At block 108, the controller 34 predicts a plurality of occupancy sets of the actor 56 over a predetermined period of time in the future using reachability analysis and the input data. In the present disclosure, the term "occupancy" means a location of the actor 56 on the road. Thus, the term "occupancy set" means a plurality of probable locations of the actor 56 on the road 54 at a specific point in time.

Figure 4:
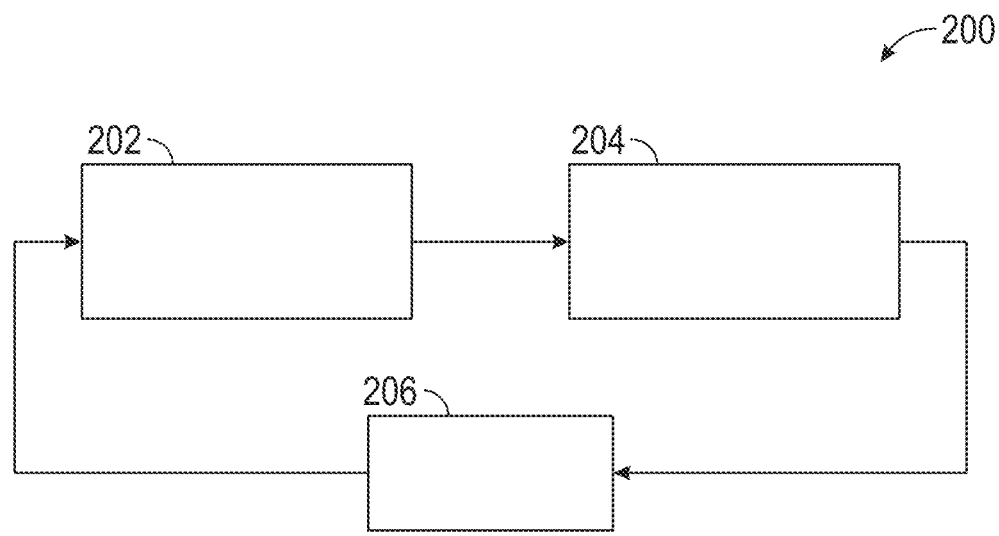
FIG. 4 is a flowchart of a method for actor prediction using reachable set computations.

FIG. 4 is a flowchart of a method 200 for predicting occupancy sets of the actor 56 over a predetermined period of time in the future using reachability analysis and the input data. The input data includes the state of the actor 56 (i.e., the actor state) and actor state uncertainty. Given the actor state and the state uncertainty, the controller 34 defines the initial occupancy set of the actor 56 at an initial time as the region that the actor 56 occupies on the road 54 at the initial time (i.e., the first-time step). Once the initial occupancy set s determined, the method 200 proceeds at block 202. At block 202, the controller 34 uses the reachability theory to determine (i.e., compute) the next forward reachable set (i.e., the forward occupancy set of the actor 56). Then, the method 200 continues to block 204. At block 204, the controller 34 determines whether the occupancy set (i.e., the forward reachable set) of the actor 56 determined in block 202 intersects other traffic participants for the predetermined period of time and/or is within a permissible road positions (e.g., within the edge lines 64 of the road 54 (FIG. 2). If the occupancy set of the actor 56 does not intersect other traffic participants and/or is within the permissible road positions, then the controller 34 designates that occupancy set as a valid occupancy set and continues to block 206. At block 206, the controller 34 designates that new occupancy set as the current occupancy set in order to determine the next occupancy set of the actor 56. Then, the method 100 returns to block 202. Thus, in the method 200, the controller 34 performs successive forward occupancy set predictions over the predetermined period of time in the future. These sets are the occupancy sets that represent the position that the actor 56 could reach in the allotted time.

Returning to FIG. 3, the occupancy set predictions determined at block 108 are fed to a reasoner at block 110. The reasoner also receives the initial trajectory data of the actor 56 determined at block 104 and the scene data generated at block 106. In addition to the scene data, the reasoner may receive (as an input data) the trajectory data of the actor 56, the actor aggressiveness, the actor type (e.g., sedan, SUV, truck, bike, pedestrian, etc.), road conditions, weather conditions, nominal predictions and confidence (i.e., uncertainty) of those nominal predictions, map data, and scene uncertainty (e.g., perception and/or location uncertainty). The reasoner selects the hyperparameters that govern the occupancy sets predictions based on the scene data. As non-limiting examples, the hyperparameters include the prediction horizon length (e.g., time horizon) for the occupancy sets predictions, the time step size, the time to brake, the time to collision, and/or the time to the nearest actor. The prediction horizon length (i.e., how far in the future) of the occupancy set predictions may be variable. For instance, the prediction horizon length of the occupancy set prediction may be a function of the estimated time to collision to the nearest actor and the nominal prediction hypothesis uncertainty. As an output, the reasoner determines the occupancy corridor constraints of the actor 56 using a machine learning model and the input data. In other words, the reasoner outputs the hyperparameters that constrain the occupancy corridor prediction. As non-limiting examples, the occupancy corridor constraints of the actor 56 include maximum acceleration of the actor 56, the minimum acceleration of the actor 56, the prediction horizon length of the occupancy set prediction, and/or the time step (e.g., coarse or fine). Supervised learning is used to train a function approximator, such as a neural network. Therefore, the reasoner may be a machine learning model, such as a neural network.

Figure 5:
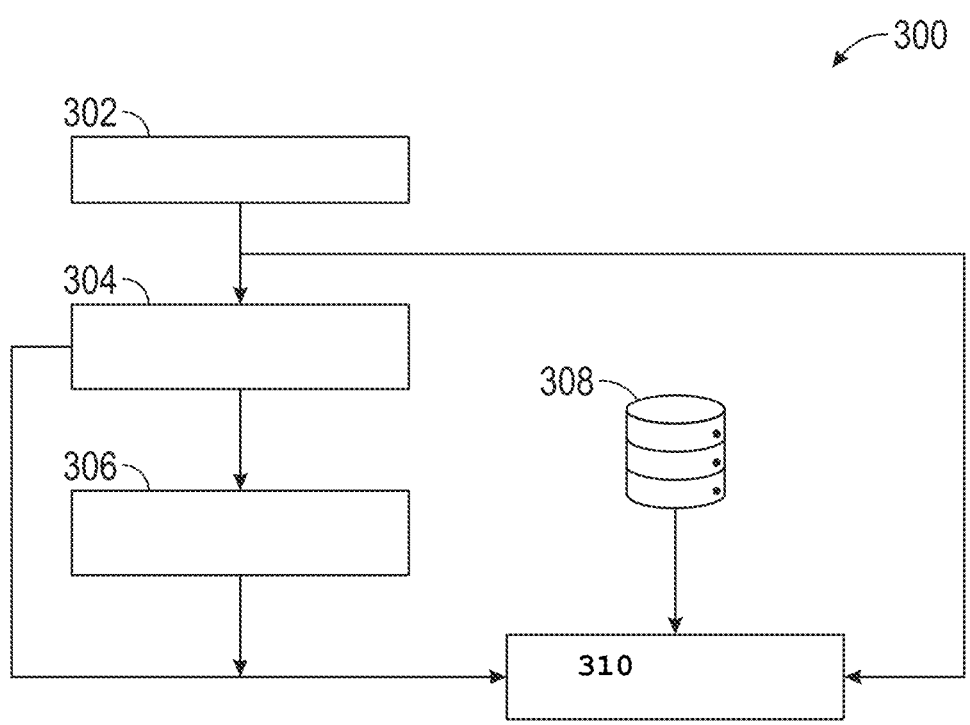
FIG. 5 is a flowchart of a method for training a reasoner.

FIG. 5 is a flowchart of a method 300 for training the reasoner described above. The method 300 is performed offline and uses supervised learning with simulated and/or observed driving data to learn mapping of inputs to outputs. The method 300 begins at block 302. At block 302, the controller 34 receives the input data. As discussed above, the input data may include the trajectory data of the actor 56, the actor aggressiveness, the actor type (e.g., sedan, SUV, truck, bike, pedestrian, etc.), road conditions, weather conditions, nominal predictions and confidence (i.e., uncertainty) of those nominal predictions, map data, scene data, and scene uncertainty (e.g., perception and/or location uncertainty). Then, the method 300 continues to block 304. At block 304, the reasoner receives the input data (i.e., simulated and/or observed driving data) and outputs accelerations of the actor 56. Next, the method 300 continues to block 306. At block 306, an occupancy predictor receives the accelerations of the actor 56 and outputs occupancy corridors 58 of the actor 56. Then, the method 300 continues to blocks 308 and 310. At block 308, ground truth trajectories of the actor 56 are received. The ground truth trajectories of the actor 56 may be based on simulated and/or observed driving data. The ground truth trajectories of the actor 56 are fed into a loss function. The loss function is a mathematical function that measures how well a machine learning model performs on a given dataset. The machine learning algorithm (i.e., the reasoner) minimizes the value of the loss function, which is achieved by adjusting the model's parameters during the training process. The loss function is used to update the machine learning parameters (e.g., the neural network parameters) of the reasoner. Therefore, the updated machine learning parameters are fed again to the reasoner at block 304. The training method 300 is repeated until the value of the loss function reaches a predetermined minimum value.

Returning to FIG. 3, the method 300 continues to block 112 after block 110. As discussed above, the reasoner outputs the hyperparameters that govern the occupancy sets predictions based on the scene data. At block 112, the occupancy predictor receives the hyperparameters that govern the occupancy sets predictions and determines (e.g., computes) the occupancy sets for the actors 56 of interest forward in time. Next, the method 200 continues to block 114.

At block 114, the controller 34 receives the occupancy sets and the uncertainty corridors determined at block 108 and the occupancy corridors determined at block 112. With this information, the predictor resolver (at block 114) blends the nominal (i.e., baseline) machine learning predictions and the occupancy sets together. The predictor resolver performs two tasks. First, the predictor resolver ensures that the data-driven occupancy corridor determination (i.e., the machine learning determination) has the same data structure as the occupancy sets predictions determined at block 108. Second, the predictor resolver also corrects the nominal predictions that are infeasible via projection and convex optimization. For example, a nominal prediction that is outside the occupancy corridor before the predetermined period of time is infeasible and/or inconsistent with the training data. The correction mechanism finds the closest trajectory to the occupancy set prediction that is inside the occupancy regions for the initial time steps and minimizes the errors for the remaining times. To do so, the prediction solver may use an optimization cost function as defined by the following equations:

$$\min_{\varphi} J = \frac{1}{2}(X - \Psi)^T(X - \Psi)$$

$$\text{s.t. } \psi(i) \in O_i, i = 1, \ldots, N$$

$$X = [x(0), x(1), \ldots, x(N)]^T$$

$$\Psi = [\psi(0), \psi(1), \ldots, \psi(N)]^T$$

where:
J is the optimization cost function;
X are the waypoints of the corrected trajectory prediction;
$\psi$ are the waypoints of the infeasible trajectory prediction;
i is the time index;
N is the number of time steps; and
$O_i$ is the occupancy set at i time index.

At block 114, the predictor resolver outputs an occupancy corridor 58 for the actor 56. Then, the method 100 proceeds to block 116. At block 116, the occupancy corridor 58 of the actor 56 is fed to the behavior planning algorithm of the host vehicle 10. The controller 34 of the host vehicle 10 the controls the movement of the host vehicle 10 based on the occupancy corridor 58 of the actor 56. For instance, the controller 34 may determine candidate trajectories for the host vehicle 10 and compare those candidate trajectories with occupancy corridor 58 of the actor 56. If a candidate trajectory for the host vehicle 10 intersects the occupancy corridor 58 of the actor 56, the controller 34 removes that candidate trajectory. If a candidate trajectory for the host vehicle 10 intersects the long-term data-driven occupancy prediction of the actor 56, the controller 34 allows this candidate trajectory in the short-term. Further, if a candidate trajectory for the host vehicle 10 does not intersect the occupancy corridor 58 or the long-term data-driven occupancy prediction of the actor 56, then the candidate trajectory is deemed acceptable and the controller 34 commands the host vehicle 10 autonomously move along this candidate trajectory.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for predicting an actor occupancy corridor, comprising:
    receiving input data, wherein the input data includes map data and initial trajectory data, the map data includes a map of an area surrounding an actor, and the initial trajectory data includes an initial trajectory of the actor;
    predicting a plurality of occupancy sets of the actor over a predetermined period of time in a future using a reachability theory analysis and the input data;
    determining occupancy corridor constraints of the actor using a machine learning model and the input data, wherein a prediction horizon length of the occupancy set prediction is a function of the estimated time to collision to the nearest actor and a nominal prediction hypothesis uncertainty;
    providing the occupancy sets and the nominal machine learning predictions to a predictor resolver, wherein the predictor resolver blends the nominal machine learning predictions and the occupancy sets together and corrects the nominal predictions that are infeasible via projection and convex optimization, thereby further determining the occupancy corridor constraints;
    determining an occupancy corridor of the actor using the occupancy corridor constraints of the actor using the machine learning model and the occupancy sets of the actor using a reachability analysis; and
    controlling a movement of a host vehicle based on the occupancy corridor of the actor.

2. The method of claim 1, further comprising:
    receiving perception data from a plurality of sensors of the host vehicle, wherein the perception data includes information about the area surrounding the actor; and
    fusing the perception data with the map data to generate scene data, wherein the scene data includes a nominal route path and a road centerline of a road, and the actor is moving on the road.

3. The method of claim 2, wherein the initial trajectory data includes a longitudinal acceleration and a lateral acceleration of the actor, the reachability analysis uses the longitudinal acceleration and the lateral acceleration of the actor, and the occupancy sets of the actor is a forward reachable set over the predetermined period of time.

4. The method of claim 3, wherein predicting the occupancy sets of the actor further comprises:
    determining that the forward reachable set of the actor does not intersect other traffic participants for the predetermined period of time; and
    determining that the forward reachable set of the actor is within permissible road positions.

5. The method of claim 4, further comprising:
    using a reasoner to determine output accelerations of the actor using the input data;
    wherein the occupancy corridor is determined using the output accelerations of the actor.

6. The method of claim 5, wherein the occupancy corridor constraints of the actor include maximum acceleration of the actor and minimum acceleration of the actor.

7. The method of claim 6, further comprising determining that a trajectory of the host vehicle intersects the occupancy corridor of the actor.

8. The method of claim 7, further comprising removing the trajectory of the host vehicle that intersects the occupancy corridor of the actor.

9. The method of claim 6, further comprising determining that a trajectory of the host vehicle does not intersect the occupancy corridor of the actor.

10. The method of claim 9, wherein controlling the movement of the host vehicle based on the occupancy corridor of the actor includes moving along the trajectory of the host vehicle that does not intersect the occupancy corridor of the actor.

11. A system for predicting an actor occupancy corridor, comprising:
    a plurality of sensors;
    a controller in communication with the plurality of sensors, wherein the controller includes a processor and a non-transitory computer-readable medium, and the controller is programmed to:
        receive input data, wherein the input data includes map data and initial trajectory data, the map data includes a map of an area surrounding an actor, and the initial trajectory data includes an initial trajectory of the actor;
        predict a plurality of occupancy sets of the actor over a predetermined period of time using reachability analysis and the input data;
        determine occupancy corridor constraints of the actor using a machine learning model and the input data, wherein a prediction horizon length of the occupancy set prediction is a function of the estimated time to collision to the nearest actor and a nominal prediction hypothesis uncertainty;
        provide the occupancy sets and the nominal machine learning predictions to a predictor resolver, wherein the predictor resolver blends the nominal machine learning predictions and the occupancy sets together and corrects the nominal predictions that are infeasible via projection and convex optimization, thereby further determining the occupancy corridor constraints;
        determine an occupancy corridor of the actor using the occupancy corridor constraints of the actor using a machine learning model and the plurality of occupancy sets of the actor using reachability analysis; and
        control a movement of a host vehicle based on the occupancy corridor of the actor.

12. The system of claim 11, wherein the controller is programmed to:
    receive perception data from a plurality of sensors of the host vehicle, wherein the perception data includes information about the area surrounding the actor; and
    fuse the perception data with the map data to generate scene data, wherein the scene data includes a nominal route path and a road centerline of a road, and the actor is moving on the road.

13. The system of claim 12, wherein the initial trajectory data includes a longitudinal acceleration and a lateral acceleration of the actor, the reachability analysis uses the longitudinal acceleration and the lateral acceleration of the actor, and the occupancy sets of the actor is a forward reachable set over the predetermined period of time.

14. The system of claim 13, wherein the controller is programmed to:
determine that the forward reachable set of the actor does not intersect other traffic participants for the predetermined period of time; and
determine that the forward reachable set of the actor is within permissible road positions.

15. The system of claim 14, wherein the controller is programmed to:
use a reasoner to determine output accelerations of the actor using the input data;
wherein the occupancy corridor is determined using the output accelerations of the actor.

16. The system of claim 15, wherein the occupancy corridor constraints of the actor include maximum acceleration of the actor and minimum acceleration of the actor.

17. The system of claim 16, wherein the controller is programmed to determine that a trajectory of the host vehicle intersects the occupancy corridor of the actor.

18. The system of claim 17, wherein the controller is programmed to remove the trajectory of the host vehicle that intersects the occupancy corridor of the actor.

19. The system of claim 16, wherein the controller is programmed to determine that a trajectory of the host vehicle does not intersect the occupancy corridor of the actor.

20. A tangible, non-transitory, machine-readable medium, comprising machine-readable instructions, that when executed by a processor, cause the processor to:
receive input data, wherein the input data includes map data and initial trajectory data, the map data includes a map of an area surrounding an actor, and the initial trajectory data includes an initial trajectory of the actor;
predict a plurality of occupancy sets of the actor over a predetermined period of time in a future using reachability analysis and the input data;
determine occupancy corridor constraints of the actor using a machine learning model and the input data, wherein a prediction horizon length of the occupancy set prediction is a function of the estimated time to collision to the nearest actor and a nominal prediction hypothesis uncertainty;
provide the occupancy sets and the nominal machine learning predictions to a predictor resolver, wherein the predictor resolver blends the nominal machine learning predictions and the occupancy sets together and corrects the nominal predictions that are infeasible via projection and convex optimization, thereby further determining the occupancy corridor constraints;
determine an occupancy corridor of the actor using the occupancy corridor constraints of the actor using a machine learning model and the occupancy sets of the actor using reachability analysis; and
control a movement of a host vehicle based on the occupancy corridor of the actor.

* * * * *